V. WALL.
COW PEA CUTTER.
APPLICATION FILED APR. 5, 1915.
1,177,158.
Patented Mar. 28, 1916.
2 SHEETS—SHEET 1.
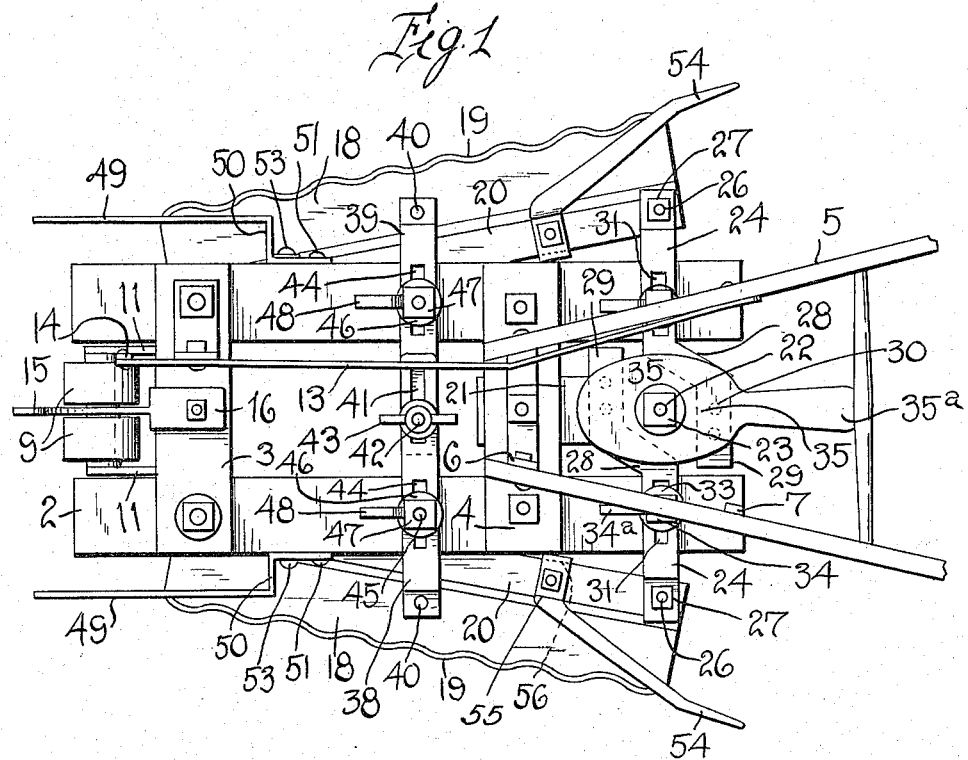
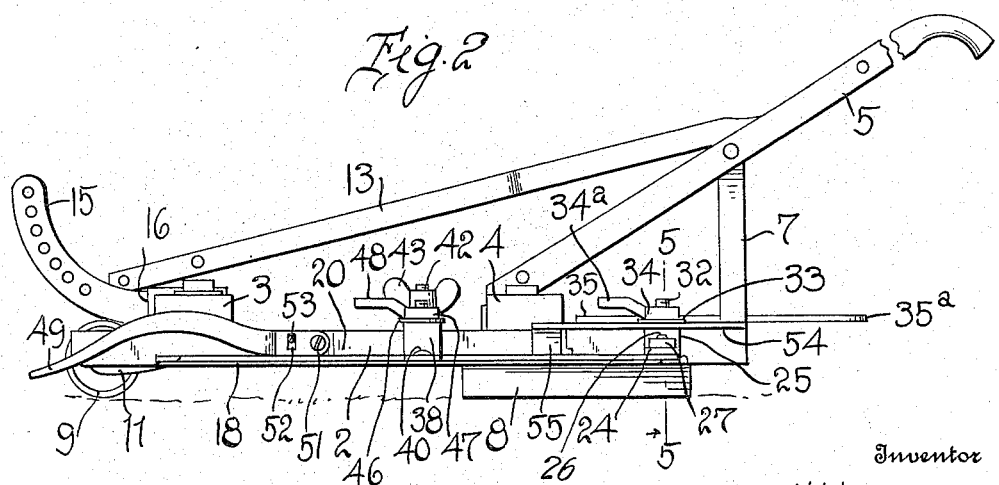
Inventor
V. WALL
By Watson E. Coleman
Attorney

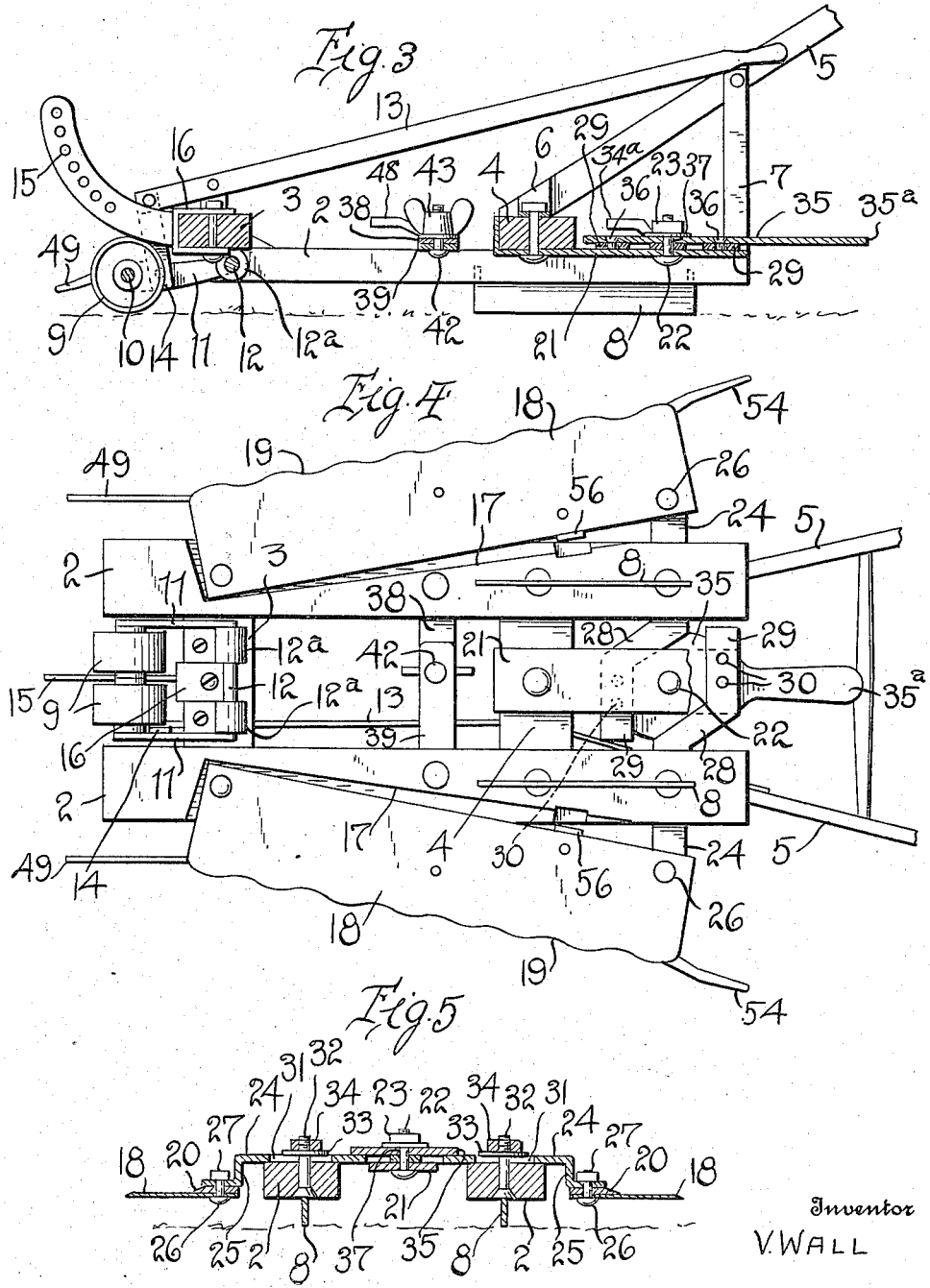

UNITED STATES PATENT OFFICE.

VALENTIN WALL, OF KNOX, INDIANA.

COW-PEA CUTTER.

1,177,158.  Specification of Letters Patent.  Patented Mar. 28, 1916.

Application filed April 5, 1915. Serial No. 19,227.

*To all whom it may concern:*

Be it known that I, VALENTIN WALL, a citizen of the United States, residing at Knox, in the county of Starke and State of Indiana, have invented certain new and useful Improvements in Cow-Pea Cutters, of which the following is a specification, reference being had to the accompanying drawings.

My invention relates to agricultural machines, and particularly machines for cutting cow peas. In machines of this character it is desirable to provide for cutting the vines as close to the ground as possible, and further to provide for increasing or decreasing the swath cut by the machine, and further to provide for lifting overhanging vines so that they shall not be cut unnecessarily. These objects are attained by the mechanism which will be hereafter described. And further means are provided whereby the wheels supporting the forward end of the machine may be depressed, thereby lifting the machine up in position to permit its easy transportation, or whereby the wheels may be raised to permit the machine to be lowered to its cutting position.

Still another object attained by my machine is the provision of means for readily adjusting the blades to increase or decrease the swath, and means for locking the blades in their adjusted position, if desired.

Other objects will appear in the course of the following description.

My invention is illustrated in the accompanying drawings, wherein:

Figure 1 is a top plan view of my machine; Fig. 2 is a side elevation thereof; Fig. 3 is a longitudinal section through the machine; Fig. 4 is a bottom plan view; Fig. 5 is a transverse section on the line 5—5 of Fig. 2.

Referring to these drawings, it will be seen that the frame of the machine consists of the longitudinal beams 2, braced apart by the forward transversely extending brace beam 3 and by the rearward transversely extending brace beam 4. These beams are preferably bolted to each other, but may be connected to each other in any suitable manner so as to provide a rigid frame.

Mounted upon the rear cross beam 4 and extending up and rearward therefrom are the handles 5, these handles at their lower ends being supported in a clip 6 attached in any suitable manner to the beam 4. The handles are also braced by the upwardly extending braces 7, which, at their lower ends, are angularly bent and attached to the rear ends of the beams 2. Upon the under faces of the beams 2 are longitudinally extending runners 8, these runners being preferably disposed adjacent the rear ends of the beams 2, and being of course parallel to each other and to the line of draft. The forward end of the machine is adapted to be supported upon wheels 9, which are relatively wide as regards their treads, and are mounted upon a transverse shaft 10 which in turn is supported upon arms 11 formed integral with a transversely extending shaft 12, this shaft 12 being supported in suitable bearings 12ª mounted upon the under side of the beam 3. In order to provide for raising and depressing these wheels 9, I pivot upon the beam 3 the lever 13 which extends to the rear of the machine and whose forward end is pivotally connected by means of a link 14 to one of the arms 11. It will be obvious that by raising this lever the wheels will be depressed, and that by lowering the lever the wheels will be raised. The rear end of the lever is deflected so that it may engage over one of the braces 7, or engage with any other suitable supporting means whereby to hold the rollers depressed.

A draft bar 15 is mounted upon the beam 3 by means of a U-shaped clip 16 which is bolted to the beam, this draft bar extending forward and upward and being provided with a plurality of perforations to which a clevis may be connected and by which any suitable draft appliance may be operatively connected to the machine.

The under faces of the beams are cut away or recessed, as at 17, and pivoted at their forward inner corners to the under faces of the beams 2 and disposed normally in said recesses are the cutting blades 18. Each of these cutting blades is formed with a sinuous cutting edge 19 and with a reinforced back 20. For the purpose of expanding or contracting the rear ends of the cutting blades so as to increase or decrease the extent of cut, I mount upon the rear cross bar 4 the rearwardly extending supporting bracket 21 provided at its middle with the upwardly extending screw-threaded stud 22 which may have the form of a bolt clamped upon the bracket 21 by means of a nut 23.

Pivotally engaged with the rear inner corner of each of the cutting blades 18 is a link 24. The outer end of each link is downwardly bent, as at 25, and provided with a bolt hole through which a pivot bolt 26 passes, this pivot bolt being operatively connected in any suitable manner to the blade and being held in engagement with the link by means of a nut 27. Each link passes over the corresponding longitudinally extending beam 2, and each link at its inner end is angularly bent, as at 28, and then laterally extended to provide the offset end 29, this offset end being formed with a plurality of perforations 30. The offset ends of the link rest upon and have sliding engagement with the upper face of the bracket 21. Each link is longitudinally slotted, as at 31, and extending upward from the corresponding beam 2, over which the link passes, is a bolt 32 which passes through the slot 31. This bolt is screw-threaded and carries upon it a washer 33 which bears upon the upper face of the link, and a nut 34 having a handle 34ª whereby it may be tightened or loosened.

Oscillatively mounted upon the stud 22 is an actuating member 35 having an oval body and a rearwardly extending handle 35ª. This member 35 is flat and the body of the member is relatively large and formed with two diametrically disposed lugs 36 and with a central opening 37 through which the stud 22 passes. Thus the member 35 is oscillatively mounted upon the stud 22, the lugs 36 extending into perforations in the links 24. It will now be obvious that an oscillation of the member 35 in one direction will cause the drawing of the links toward each other and the consequent contraction of the rear ends of the cutting blades, and that a motion of the member 35 in the opposite direction will cause the outward movement of the links and the expansion of the rear ends of the cutting blades. Thus the inclination of the cutting blades may be readily varied and the width of the cut accordingly adjusted.

After the cutting blades have been adjusted to the proper degree they may be clamped in position by turning down upon the nuts 34. If desirable, however, the nuts 34 may be kept just sufficiently tight to hold the links down upon the upper faces of the bars 2 and prevent accidental shifting of the cutting blades but not prevent easy manual actuation of the cutting blades to increase or decrease their angularity with respect to the line of draft.

For the purpose of bracing the cutting blades, I provide a brace attached to the cutting blades forward of the brace 4; this brace consisting of two relatively thin metallic strips, one being designated 38 and the other 39. Each strip is angularly bent at its extremity, and riveted, bolted, or otherwise pivotally attached to the corresponding blade, as at 40. The strips overlap each other and one of the strips is provided with a longitudinally extending slot 41, while the other strip is provided with a bolt 42 carrying a nut 43. Each strip is also longitudinally slotted, as at 44, and extending upward from the beams 2 are the guide bolts 45 which pass through these slots and which carry the washers 46 and the clamping nuts 47 provided with the handles 48. It will thus be seen that after the cutting blades have been adjusted to the degree required, these braces may be rigidly clamped to resist any further movement of the cutting blades and to hold them in their adjusted positions.

In order to lift any plants which may have fallen over in front of the cutters and thereby prevent unnecessary cutting of the plants except at the roots, I provide the lifting fingers 49 disposed at the forward end of the machine. Each of these lifters is angularly bent at its rear end, as at 50, and pivoted to the side edge of the corresponding bar 2 by means of a pivot screw 51. Just forward of this pivot screw the base portion of the finger is vertically slotted, as at 52, and passing through this slot and into the beam 2 is a clamp screw 53. Thus the free end of the finger may be raised or lowered to a degree necessary to engage the fallen plants and raise them so that they will not be engaged by the cutting edge of the blade. Each finger is upwardly bowed and is pointed at its forward end. Also mounted upon the blades adjacent their rear ends are the rearwardly and outwardly projecting plant deflecting members 54. These members are angularly formed at their base, as at 55, and attached to the reinforced portion of the cutting blade, the corresponding beam 2 being notched to receive this angular base, the base being held from rotative movement with relation to the cutters by means of a lip 56 formed upon the base engaging the back of the corresponding cutter. Each of these members 54 extends rearward and outward beyond the rear corner of the cutter, and the function of these cutters is to push the plants, after they have been cut, into rows so that they may be readily gathered up.

The operation of my invention will be fully understood from the drawings and previous description. I have found the machine extremely effective in practice. By adjusting the blades the machine may be made to conform to the width between the rows of peas, and the width of the swath cut by each blade may be regulated. The adjustment is very readily made, and when made the cutters may be held firmly against any accidental disadjustment due to engagement with the plants. The cutters will cut the plants very close to the ground thus saving the peas, and at the same time the rear end of the machine will be readily raised if necessary to bring the cutters out of action. By adjusting the lever 13 the height of the cutters may also be regulated, and it is obvious that means may of course be provided for supporting this lever in a number of adjusted positions. The runners 8 hold the machine to its work and prevent any lateral movement of the machine and cause the machine to run steadily.

It will be noted in the drawings that the nuts, bolts, braces, etc., are on a scale relatively large as compared with the size of the machine itself. This is done, however, for the purpose of illustrating the details of construction, which, if upon the proper scale, would be too small to be clearly noted.

Having thus described my invention, what I claim is:

1. In a machine of the character described, a supporting frame, horizontally disposed cutting blades each pivoted at its forward end to the frame at opposite sides thereof, means engaging the rear end of the cutting blades for shifting them laterally outward or inward, and a sectional brace mounted upon the cutting blades and extending over the said frame, and means for holding the sectional brace in adjusted position.

2. In a machine of the character described, a supporting frame, cutting blades disposed on opposite sides of the frame, each blade being pivoted at its forward end to the frame for movement in a horizontal plane, links pivotally connected to the rear ends of the frame, each link being angularly bent, then extended to provide an offset portion, the offset portions of the links being disposed opposite each other, an adjusting member pivoted at its center and engaging at opposite ends with said links, the adjusting member having a handle, and means engaging said links for holding the links in their adjusted positions.

3. In a machine of the character described, a supporting frame, horizontally disposed cutting blades one on each side of the frame and each pivoted at its forward end thereto, and means for shifting the rear ends of the blades outward or inward comprising links each pivoted to the rear end of a corresponding cutting blade, each link extending over the supporting frame, then being angularly bent and extended parallel to the first-named portion, the first-named portion being longitudinally slotted, the last-named portion being perforated, a supporting bracket mounted upon the frame, an actuating member pivotally mounted upon the bracket and having lugs engageable in perforations in the links, guide bolts projecting upward from the frame and passing through the slots of the links, and nuts mounted upon said guide bolts.

4. In a machine of the character described, a supporting frame, cutting blades pivotally mounted upon the frame and extending rearward and outward therefrom, means for contracting or expanding the rear ends of the cutting blades with relation to each other, and means for holding the cutting blades in their adjusted position and bracing them, said means comprising brace sections each mounted upon one of the blades and overlapping each other, one of said brace sections being slotted, a bolt projecting from the other brace section through said slot and provided with a nut, guide bolts extending upward from the supporting frame, the brace sections being slotted for said bolts, and clamping nuts mounted upon said bolts.

5. In a machine of the character described, a supporting frame including parallel frame bars, cutting blades pivotally mounted at their forward ends upon the said frame bars and extending rearward and outward therefrom, and plant lifting fingers attached to the frame bars adjacent the forward ends of the blades and extending forward over the forward ends of the blades on a line with the edges thereof.

6. In a machine of the character described, a supporting frame including parallel beams, cutting blades pivotally mounted at their forward ends upon said beams and extending rearward and outward therefrom, and plant lifting fingers pivotally mounted upon the beams for movement in a vertical plane, said plant lifting fingers extending forward over the forward ends of the cutting blades adjacent the cutting edges thereof and then downward to a position below the level of the cutting blades.

In testimony whereof I hereunto affix my signature in the presence of two witnesses.

VALENTIN WALL.

Witnesses:
GEORGE E. PETTIS,
MAHLON J. HARZTER.

Copies of this patent may be obtained for five cents each, by addressing the "Commissioner of Patents, Washington, D. C."